(12) United States Patent
Vasilevskiy et al.

(10) Patent No.: US 11,734,092 B2
(45) Date of Patent: *Aug. 22, 2023

(54) SYSTEMS AND METHODS FOR EXTENDING THE DATA MODEL OF A MONOLITHIC DATABASE THROUGH A MICROSERVICE FOR A MULTI-TENANT PLATFORM

(71) Applicant: Zuora, Inc., Redwood City, CA (US)

(72) Inventors: Alexander Vasilevskiy, Palo Alto, CA (US); Henning Schmiedehausen, Los Altos, CA (US); Suryatej Mukkamalla, San Mateo, CA (US); Rui Zhang, Sunnyvale, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,407

(22) Filed: Aug. 9, 2022

(65) Prior Publication Data

US 2022/0382607 A1 Dec. 1, 2022

Related U.S. Application Data

(63) Continuation of application No. 16/892,142, filed on Jun. 3, 2020, now Pat. No. 11,409,586.

(Continued)

(51) Int. Cl.
*G06F 16/00* (2019.01)
*G06F 9/54* (2006.01)
(Continued)

(52) U.S. Cl.
CPC ........ *G06F 9/547* (2013.01); *G06F 16/24554* (2019.01); *G06F 16/27* (2019.01); *G06F 16/288* (2019.01)

(58) Field of Classification Search
CPC .... G06F 9/547; G06F 16/24554; G06F 16/27; G06F 16/288
See application file for complete search history.

(56) References Cited

U.S. PATENT DOCUMENTS

| 8,639,625 B1 | 1/2014 | Ginter et al. |
| 9,015,493 B2 | 4/2015 | Hu et al. |
| (Continued) | | |

FOREIGN PATENT DOCUMENTS

| DE | 112020000213 T5 | 9/2021 |
| DE | 112020003228 T5 | 4/2022 |
| (Continued) | | |

OTHER PUBLICATIONS

"Architecture for Managing Clouds—A White Paper from the Open Cloud Standards Incubator", Document No. DSP-IS0102, DMTF Informational, Version 1.0.0, Study Period 2013-2016, International Telecommunication Union, Geneva, Switzerland, Version 1.0.0, Jun. 18, 2010, [retrieved on Sep. 9, 2019], XP044096122, pp. 1-57.

*Primary Examiner* — Alexander Khong
(74) *Attorney, Agent, or Firm* — Sheppard, Mullin, Richter & Hampton LLP

(57) ABSTRACT

A multi-tenant system comprises a monolithic database storing global records, each including global fields common for all tenants; a custom field database storing custom records, each including custom fields for a tenant; a custom field record service processing a custom record storage request by instructing the custom field database to store custom field values of the custom record for the tenant, and processing a custom record fetch request by instructing the custom field database to retrieve the custom field values; a monolithic application configured to receive a record storage or fetch request, configured to partition the record storage request into the global record storage request and the custom record storage request, configured to send the custom record (Continued)

storage request to the custom field record service, configured to partition the record fetch request into the global record fetch request and the custom record fetch request, and configured to send the custom record fetch request to the custom field record service.

21 Claims, 9 Drawing Sheets

Related U.S. Application Data

(60) Provisional application No. 62/856,670, filed on Jun. 3, 2019.

(51) Int. Cl.
*G06F 16/2455* (2019.01)
*G06F 16/28* (2019.01)
*G06F 16/27* (2019.01)

(56) References Cited

U.S. PATENT DOCUMENTS

| | | |
|---|---|---|
| 9,369,455 B2 | 6/2016 | Huang et al. |
| 10,341,385 B2 | 7/2019 | Moloian et al. |
| 10,834,770 B2 | 11/2020 | Tang |
| 11,204,902 B2 | 12/2021 | Guionneau et al. |
| 11,301,617 B2 | 4/2022 | Schmiedehausen |
| 11,615,066 B2 | 3/2023 | Vasilevskiy et al. |
| 2003/0191677 A1 | 10/2003 | Akkiraju et al. |
| 2004/0239981 A1 | 12/2004 | Ducato et al. |
| 2005/0223022 A1 | 10/2005 | Weissman et al. |
| 2006/0235831 A1* | 10/2006 | Adinolfi .............. G06Q 40/00 |
| 2008/0162491 A1 | 7/2008 | Becker et al. |
| 2009/0083589 A1 | 3/2009 | Fulton et al. |
| 2010/0103837 A1 | 4/2010 | Jungck et al. |
| 2010/0169351 A1 | 7/2010 | Kulkarni et al. |
| 2012/0030240 A1 | 2/2012 | Engelhardt et al. |
| 2012/0130973 A1 | 5/2012 | Tamm et al. |
| 2012/0226811 A1 | 9/2012 | Parmar et al. |
| 2013/0097204 A1 | 4/2013 | Venkataraman et al. |
| 2013/0104150 A1 | 4/2013 | Rdzak et al. |
| 2014/0006441 A1 | 1/2014 | Torman et al. |
| 2014/0012801 A1 | 1/2014 | Soby |
| 2014/0075239 A1 | 3/2014 | Prathipati et al. |
| 2015/0280959 A1 | 10/2015 | Vincent |
| 2016/0065522 A1 | 3/2016 | Vasudev et al. |
| 2016/0267294 A1* | 9/2016 | Weissman .............. G06F 16/289 |
| 2016/0308963 A1 | 10/2016 | Kung |
| 2016/0316028 A1 | 10/2016 | Sengupta et al. |
| 2017/0091231 A1* | 3/2017 | DiFranco .............. G06F 16/211 |
| 2019/0095533 A1* | 3/2019 | Levine ................ G06F 16/9535 |
| 2019/0158353 A1 | 5/2019 | Johnson et al. |
| 2019/0258636 A1 | 8/2019 | Bhattacharjee et al. |
| 2022/0078692 A1 | 3/2022 | Stojanovski et al. |
| 2022/0287024 A1 | 9/2022 | Hahn |

FOREIGN PATENT DOCUMENTS

| | | |
|---|---|---|
| SE | 2019050841 W | 9/2019 |
| SE | 2020050840 W | 9/2020 |

* cited by examiner

Global Records 300

| 302 Tenant ID | 304 Record Identifier | 306 Customer Name | 308 Account Balance | 310 Last Invoice | 312 Status |
|---|---|---|---|---|---|
| 314 123456 | 316 112233 | 318 Joe Smith | 320 123.00 | 322 4/1/2020 | 324 Active |
| 234567 | 112234 | Tony Wong | 168.00 | 4/4/2020 | Active |

Custom Fields Records 400

| 402 Tenant ID | 404 Record Identifier | 406 Bill To |
|---|---|---|
| 408 123456 | 410 112233 | 412 Pam Smith |

| 502 | 504 | 506 | 508 | 510 | 512 | 514 |
|---|---|---|---|---|---|---|
| Tenant ID | Record Identifier | Customer Name | Account Balance | Last invoice | Status | Bill To |
| 516 | 518 | 520 | 522 | 524 | 526 | 528 |
| 123456 | 112233 | Joe Smith | 123.00 | 4/1/2020 | Active | Pam Smith |

Full Record 500

FIG. 5

SYSTEMS AND METHODS FOR EXTENDING THE DATA MODEL OF A MONOLITHIC DATABASE THROUGH A MICROSERVICE FOR A MULTI-TENANT PLATFORM

CROSS-REFERENCE TO RELATED APPLICATIONS

The present application is a continuation application of U.S. patent application Ser. No. 16/892,142, entitled "Systems And Methods For Extending The Data Model Of A Monolithic Database Through A Microservice For A Multi-Tenant Platform," filed Jun. 3, 2020, now U.S. Pat. No. 11,409,586, which claims the benefit of U.S. Provisional Patent Application No. 62/856,670, filed Jun. 3, 2019 and entitled "Extending Data Model of Monolithic Database Through a Microservice for a Multi-Tenant Platform," which are hereby incorporated by reference herein. The present application also incorporates by reference U.S. Nonprovisional application Ser. No. 16/431,544, entitled "Systems and Methods for Providing Uniform Access in a Multi-Tenant System" filed on Jun. 4, 2019, now U.S. Pat. No. 10,956,243 and U.S. Nonprovisional application Ser. No. 16/892,174, entitled "Systems and Methods for Providing Custom Objects for a Multi-Tenant Platform with Microservices Architecture," filed on Jun. 3, 2020, now U.S. Pat. No. 11,615,066.

TECHNICAL FIELD

This disclosure pertains to multi-tenant computing systems. More specifically, this disclosure pertains to extending the data model of a monolithic database through a microservice for a multi-tenant platform.

BACKGROUND

Many Software as a Service (SaaS) multi-tenant companies provide access to a fixed data model common across all tenants. However, a fixed data model is difficult to customize on a per-tenant basis.

Most monolithic applications keep all data within a single database, where custom fields can be implemented using a new database table. At runtime, a database join is performed to combine data from the main table to the data with custom fields. This imposes significant re-implementation costs. And, data migration may be required to add new features.

SUMMARY

A claimed solution rooted in computer technology overcomes problems specifically arising in the realm of computer technology.

Embodiments of the invention enable customization of a fixed data model on the per-tenant basis in a multi-tenant system by extending a monolithic application with one or more custom field services (e.g., microservices). Most customer implementations require extending global fields common across all tenants in a single database (a global data model) with custom fields specific to one or more tenants. Embodiments of the invention implement custom fields as a separate web service with its own custom fields database and may perform joins of custom field data with the data of main objects in the monolithic application instead of using database joins. For example, a subscription object may have global fields (such as subscriptionNumber, description, etc.) available for all tenants, and which are stored in the monolithic database. A particular tenant (e.g., Verizon) may require two custom additional fields for its subscription objects (e.g., customfield_1 and customfield_2) to store tenant-specific information. Embodiments of the invention implement custom fields using a standalone microservice, instead of creating tenant-specific code in the monolithic application and custom-field data in the monolithic database.

Embodiments of the invention implement a provision API (e.g., Create Read Update Delete (CRUD) API 1) to manage metadata for custom fields (to create the custom fields and/or field types). Embodiments of the invention implement a work API (e.g., CRUD API 2) to manage custom record store and fetch requests, possibly sent by the monolithic application. Embodiments of the invention may implement a main service API (e.g., CRUD API 3) to enable the monolithic application to communicate with the work API. In some embodiments, the provision API might be available to external users, e.g., tenants, to generate tenant-specific and record-object-specific custom fields and/or field types. In some embodiments, the work API may be available only internally from within the system to enable the transfer of custom field data to and from the custom field service.

In some embodiments, the monolithic application may receive a record storage request with payload information, may partition the payload information into global field data and custom field data, may manage storing the global field data in the monolithic database, and may forward a custom record storage request with the custom field data via the main service API to the work API to be stored in the custom field database.

In some embodiments, the monolithic application may partition a record fetch request into a global record fetch request and a custom record fetch request, may forward the global record fetch request to the monolithic database to retrieve the global record data, and may forward the custom record fetch request via the main service API to the work API to retrieve the custom record data. Although the network system is being described as including one custom field service system, it will be appreciated that the network system could include any number of custom field service systems, and the monolithic application can send each of multiple custom record fetch requests to the different custom field service systems.

Example steps for interacting with the custom field service might include: (1) Tenant calls the provision API to add customfield_1 and customfield_2 to the Subscription object for the Tenant. (2) Tenant creates 100 Subscription records via calling the main service API from the monolithic application. In addition to passing values for global fields for a Subscription record (e.g., subscriptionNumber, description, etc.), Tenant passes values for custom fields (e.g., customfield_1 and customfield_2) for the Subscription record. (3) The monolithic application inspects each create Subscription request, separates the custom fields from the original payload and sends a create request to the custom field service via the main service API. The custom field service stores the values for the custom fields in its own storage along with the ID of the associated subscription record. The custom field service may also store a Tenant ID, or the ID of the associated subscription record may include a Tenant ID. (4) Tenant sends a record fetch request to fetch a particular subscription record to the monolithic application. The monolithic application sends a custom record fetch request to get values for the custom fields for the particular subscription record of the Tenant to the custom field service via the main service API to the work API. The custom field service provides the values for the custom fields (e.g., customfield_1 and customfield_2) via the work API to the main service API, which passes the values to the monolithic application. The monolithic application retrieves values for the global fields (subscriptionNumber, description, etc.) from the monolithic database, joins them with the values for the custom fields (customfield_1 and customfield_2), and returns full Subscription record to the Tenant.

Embodiments of the invention may provide greater scalability, and the ability to ship enhancements to custom fields more quickly to end users. Embodiments of the invention may avoid data migration when introducing new custom field features.

Some embodiments of the present invention provides a multi-tenant system comprising a monolithic database configured to store global records, each global record of the global records including global fields common for all tenants of the multi-tenant system, the monolithic database configured to store a particular global record in response to a particular global record storage request and to retrieve the particular global record in response to a particular global record fetch request; a custom field database configured to store custom records, each custom record of the custom records including one or more custom fields for a tenant of the tenants of the multi-tenant system, the custom database configured to store a particular custom record including one or more particular custom fields in association with the particular global record in response to a particular custom record storage request and to retrieve the particular custom record in response to a particular custom record fetch request; a custom field record service configured to process the particular custom record storage request by instructing the custom field database to store one or more particular custom field values of the particular custom record for the particular tenant, and to process the particular custom record fetch request by instructing the custom field database to retrieve the one or more particular custom field values of the particular custom record for the particular tenant; a monolithic application configured to receive a record storage request or a record fetch request, the monolithic application configured to partition the record storage request into the particular global record storage request and the particular custom record storage request, the monolithic application configured to send the particular custom record storage request to the custom field record service, the monolithic application configured to partition the record fetch request into the particular global record fetch request and the particular custom record fetch request, the monolithic application configured to send the particular custom record fetch request to the custom field record service; a work API configured to receive the particular custom record storage request or the particular custom record fetch request and communicate the particular custom record storage request or the particular custom record fetch request to the custom field record service; and a main service API configured to receive the particular custom record storage request or the particular custom record fetch request from the monolithic application and to communicate the particular custom record storage request or the particular custom record fetch request to the work API.

Each global record may include a tenant identifier and a record identifier. Each custom record may include a tenant identifier and a record identifier. The monolithic application may partition the record storage request into the particular global record storage request and the particular custom record storage request using a custom field map. The monolithic application may partition the record fetch request into the particular global record fetch request and the particular custom record fetch request using a custom field map. The work API may be accessible only internally. The main service API may be accessible only by the monolithic application. The custom field metadata service may be configured to generate the one or more particular custom fields for the particular tenant for the particular record. The multi-tenant system may further comprise a provision API configured to receive a particular custom field generation request to generate the one or more particular custom fields for the particular tenant for the particular record. The custom field metadata service may be configured to generate a custom field map for the monolithic database to use to partition the record storage request or the record fetch request. The multi-tenant system may further comprise a second custom database and a second custom field record service.

Embodiments of the present invention may further provide a method implemented by a multi-tenant system, the method comprising storing global records in a monolithic database, each global record of the global records including global fields common for all tenants of the multi-tenant system; storing custom records in a custom field database, each custom record of the custom records including one or more custom fields for a tenant of the tenants of the multi-tenant system; receiving a record storage request associated with a particular tenant of the tenants of the multi-tenant system; partitioning the record storage request into a particular global record storage request and a particular custom record storage request; storing in the monolithic database for the particular tenant a particular global record including particular global field values in response to the global record storage request; sending the particular custom record storage request to a main service API; sending the particular custom record storage request by the main service API to a work API; sending the particular custom record storage request by the work API to a custom field record service; and storing in the custom field database for the particular tenant a particular custom record including one or more particular custom fields in association with the particular global record in response to the custom record storage request.

Each global record may include a tenant identifier and a record identifier. Each custom record may include a tenant identifier and a record identifier. The partitioning the record storage request into a particular global record storage request and a particular custom record storage request may include using a custom field map. The method may further comprise enabling the work API to be accessible only internally. The method may further comprise enabling the main service API to be accessible only by the monolithic application. The method may further comprise generating the one or more particular custom fields for the particular tenant using a custom field metadata service. The method may further comprise receiving a custom field creation request by a provision API to generate the one or more particular custom fields for the particular tenant for the particular record. The method may further comprise generating a custom field map for the monolithic database to use to partition the record storage request. The method may further comprise receiving a record fetch request; partitioning by the monolithic application the record fetch request into a particular global record fetch request and a particular custom record fetch request; sending the particular global record fetch request to the monolithic database to retrieve the particular global field values; sending the particular custom record fetch request to the custom field record service to retrieve the one or more particular custom field values; aggregating the particular global field values and the one or more particular custom field values to generate a full record; and sending the full record to a computer device.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 3 is a diagram of a global record, according to some embodiments of the present invention.

FIG. 4 is a diagram of a custom record, according to some embodiments of the present invention.

FIG. 5 is a diagram of a full record, according to some embodiments of the present invention.

DETAILED DESCRIPTION

Figure 1:
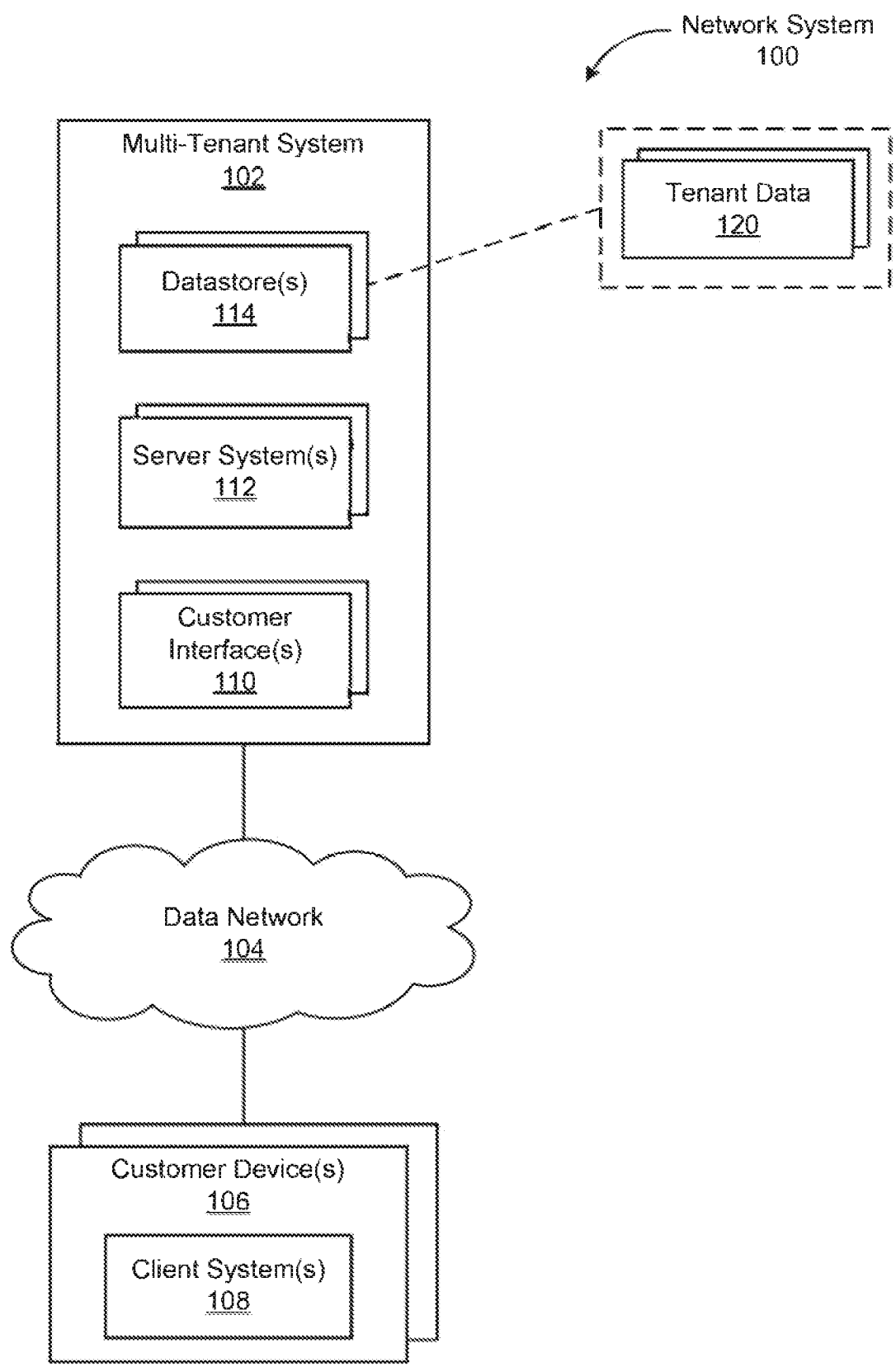
FIG. 1 is a block diagram of a network system for providing cloud-based software-as-a-service (SAAS) services of a multi-tenant system to multiple tenants, according to some embodiments of the present invention.

A claimed solution rooted in computer technology overcomes problems specifically arising in the realm of computer technology.

Embodiments of the invention enable customization of a fixed data model on the per-tenant basis in a multi-tenant system by extending a monolithic application with one or more custom field services (e.g., microservices). Most customer implementations require extending global fields common across all tenants in a single database (a global data model) with custom fields specific to one or more tenants. Embodiments of the invention implement custom fields as a separate web service with its own custom fields database and may perform joins of custom field data with the data of main objects in the monolithic application instead of using database joins. For example, a subscription object may have global fields (such as subscriptionNumber, description, etc.) available for all tenants, and which are stored in the monolithic database. A particular tenant (e.g., Verizon) may require two custom additional fields for its subscription objects (e.g., customfield_1 and customfield_2) to store tenant-specific information. Embodiments of the invention implement custom fields using a standalone microservice, instead of creating tenant-specific code in the monolithic application and custom-field data in the monolithic database.

Embodiments of the invention implement a provision API (e.g., Create Read Update Delete (CRUD) API 1) to manage metadata for custom fields (to create the custom fields and/or field types). Embodiments of the invention implement a work API (e.g., CRUD API 2) to manage custom record store and fetch requests, possibly sent by the monolithic application. Embodiments of the invention may implement a main service API (e.g., CRUD API 3) to enable the monolithic application to communicate with the work API. In some embodiments, the provision API might be available to external users, e.g., tenants, to generate tenant-specific and record-object-specific custom fields and/or field types. In some embodiments, the work API may be available only internally from within the system to enable the transfer of custom field data to and from the custom field service. In some embodiments, "available only internally" includes available only from within the internal network, available only from within the enterprise firewall, available only from the main service API, available only to the monolithic application, or the like.

In some embodiments, the monolithic application may receive a record storage request with payload information, may partition the payload information into global field data and custom field data, may manage storing the global field data in the monolithic database, and may forward a custom record storage request with the custom field data via the main service API to the work API to be stored in the custom field database.

In some embodiments, the monolithic application may partition a record fetch request into a global record fetch request and a custom record fetch request, may forward the global record fetch request to the monolithic database to retrieve the global record data, and may forward the custom record fetch request via the main service API to the work API to retrieve the custom record data. Although the network system is being described as including one custom field service system, it will be appreciated that the network system could include any number of custom field service systems, and the monolithic application can send each of multiple custom record fetch requests to the different custom field service systems.

Example steps for interacting with the custom field service might include: (1) Tenant calls the provision API to add customfield_1 and customfield_2 to the Subscription object for the Tenant. (2) Tenant creates 100 Subscription records via calling the main service API from the monolithic application. In addition to passing values for global fields for a Subscription record (e.g., subscriptionNumber, description, etc.), Tenant passes values for custom fields (e.g., customfield_1 and customfield_2) for the Subscription record. (3) The monolithic application inspects each create Subscription request, separates the custom fields from the original payload and sends a create request to the custom field service via the main service API. The custom field service stores the values for the custom fields in its own storage along with the ID of the associated subscription record. The custom field service may also store a Tenant ID, or the ID of the associated subscription record may include a Tenant ID. (4) Tenant sends a record fetch request to fetch a particular subscription record to the monolithic application. The monolithic application sends a custom record fetch request to get values for the custom fields for the particular subscription record of the Tenant to the custom field service via the main service API to the work API. The custom field service provides the values for the custom fields (e.g., customfield_1 and customfield_2) via the work API to the main service API, which passes the values to the monolithic application. The monolithic application retrieves values for the global fields (subscriptionNumber, description, etc.) from the monolithic database, joins them with the values for the custom fields (customfield_1 and customfield_2), and returns full Subscription record to the Tenant.

Embodiments of the invention may provide greater scalability, and the ability to ship enhancements to custom fields more quickly to end users. Embodiments of the invention may avoid data migration when introducing new custom field features.

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, and datastores 114. Each of the client devices 106 includes a client system 108 that accesses the cloud-based SAAS services hosted by the multi-tenant system 102. In some embodiments, the client systems 108 may be operated by employees (e.g., administrator users) of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 110 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), object-based database systems, and/or the like. In some embodiments, tenant data 120 may be stored across multiple datastores 114, with each datastore dedicated to a particular service (e.g., managing customer records, managing subscription data, managing product and/or service consumption information, managing billing information, managing payment information, and/or the like).

In some embodiments, the tenant data 120 may include subscription data, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, as described with reference to FIG. 2, the tenant data 120 may be stored in one or more monolithic databases (shown in FIG. 2) and in one or more custom field databases (shown in FIG. 2). As stated above, the tenant data 120 may be stored in different records, e.g., a subscription record, a usage record, a billing record, etc. Each record may be managed by a particular record object, e.g., a subscription record object, a usage record object, a billing record object, etc. Each record object may manage a number of global fields that are common to all of the tenants. For example, the global fields for a subscription record for each and every tenant may include record ID, a username, a subscription identifier, etc. The global fields may be stored in the monolithic database. Notably, different tenants may require different additional fields to store information for different record objects. For example, a first tenant may require two custom fields for a subscription record and one custom field for a usage record. Another tenant may require three custom fields for a subscription record and four custom fields for a usage record. Data for these custom fields can be stored in a custom field database for each record for each tenant.

The monolithic and custom field databases of the multi-tenant system 102 may manage (e.g., create, read, update, delete) tenant data 120 using different formats, different protocols, etc. A monolithic application will control data storage in the monolithic database. A custom field service (microservice) will control data storage in the custom field database. It will be appreciated that as used herein, a "service" may be single service and/or a set of services (e.g., a cluster of services).

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2A:
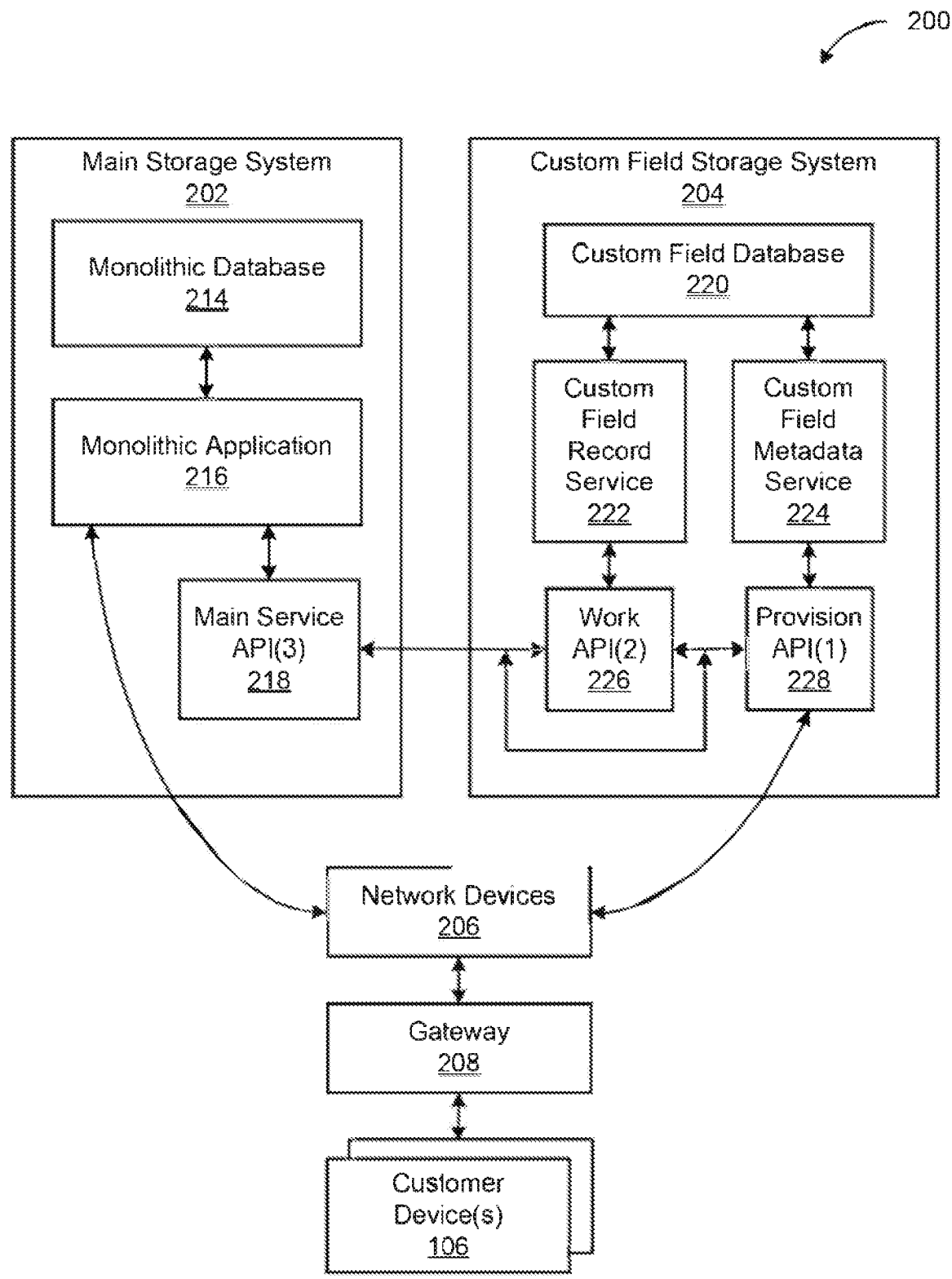
FIG. 2A is a block diagram of a portion of a multi-tenant system for extending the data model of a monolithic database through a microservice for a multi-tenant platform, according to some embodiments of the present invention.

FIG. 2A is a block diagram of a multi-tenant system 200 for extending the data model of a monolithic database 214 using a microservice for a multi-tenant platform, according to some embodiments. The multi-tenant system 200 includes a main storage system 202, a custom field storage system 204, one or more network devices 206 coupled to the main storage system 202 and to the custom field storage system 204, a gateway 208 coupled to the network devices 206, and one or more customer devices 106 coupled to the gateway 208.

In some embodiments, the main storage system 202 includes a monolithic database 214, a monolithic application 216 coupled to the monolithic database 214 and to the network devices 206, and a main service API 218 (API 3) coupled to the monolithic application 216. In some embodiments, the main service API 218 is part of the monolithic application 216. The custom field storage system 204 includes a custom field database 220, a custom field record service 222 coupled to the custom field database 220, a custom field metadata service 224 coupled to the custom field database 220, a work API 226 (API 2) coupled to the custom field record service 222 and to the main service API 218, and a provision API 228 coupled to the custom field metadata service 224, to the work API 226, to the main service API 218, and to the network devices 206. Although the custom field record service 222 and the custom field metadata service 224 are being shown as separate services, each with their own API, the custom field record service 222 and the custom field metadata service 224 may be components of a single service, which may only need a single API capable of communicating with the monolithic application 216 via the main service API 218 and with tenants via the network devices 206.

Customer devices 106 may be capable of performing several tenant-centric database functions, including custom field creation, record storage, and record retrieval (possibly using queries and/or report generation requests). During a custom field creation function, a tenant via a customer device 106 may send a create custom field request for a particular record object via a user interface 110 to the gateway 208. In some embodiments, the create custom field request will include a tenant identifier, a record identifier and one or more custom fields to associate therewith. The gateway 208 receives the create custom field request and transfers the create custom field request via the network devices 206 to the provision API 228. The provision API 228 receives the create custom field request and instructs the custom field metadata service 224 to generate particular custom field metadata in the custom field database 220. The particular custom field metadata will enable the storage of a tenant identifier identifying the tenant (e.g., Verizon), a record identifier identifying the record object (e.g., Subscription object) associated with the custom field, and a custom field identifier (e.g., "Bill to"). In some embodiments, the particular custom field metadata may also include a custom field type (e.g., an address, a number, a string, etc.). In some embodiments, the create custom field request could be capable of requesting multiple custom fields at a time.

The custom field metadata service 224 may generate a custom field map for the monolithic application 216 to use to assist in identifying one or more custom field values associated with a particular custom field service from payload information in a record storage request to assist in generating one or more custom record storage requests, and to assist in generating one or more custom record fetch requests to the particular custom field service for custom field values in response to record fetch requests, queries and/or report generation requests. The custom map may also be used by the custom field record service 222 to generate custom field records in the custom field database 220 in response to record storage requests. The custom field metadata service 224 may send the custom field map to the monolithic application 216 via the work API 226, the main service API 218, and/or the network device 206. The custom field metadata service 224 may send the custom field map to the custom field record service 222 via the work API 226 and/or the network devices 206. In a network system with multiple custom field services, the monolithic application 216 may be equipped with multiple custom field maps (or an aggregated field map) for the multiple custom field services, so that the monolithic application 216 knows which custom field services store which custom fields of a record.

During a record storage function, according to some embodiments, the customer device 106 may use the user interface 110 to send a record storage request (with payload information) of a particular record (e.g., the subscription record) to the gateway 208. The gateway 208 transfers the record storage request via the network devices 206 to the monolithic application 216. The monolithic application 216 separates the custom field values using the custom field map, and generates a custom record storage request. In some embodiments, the custom record storage request includes the tenant identifier, the record identifier and the custom field values for the custom fields extracted from the payload information. The monolithic application 216 sends the custom record storage request via the main service API 218 to the work API 226, which forwards the custom record storage request to the custom field record service 222 to process. The custom field record service 222 stores the custom field values associated with tenant identifier and the record identifier in the custom field database 220. The monolithic application 216 also generates a global record storage request, which the monolithic database 214 will process or which the monolithic application 216 will process on the monolithic database 214. In some embodiments, the global record storage request includes the tenant identifier, the record identifier and the global field values for the global fields. In some embodiments, the global record storage request may be the same as a traditional global record storage request.

During a record retrieval function, according to some embodiments, the customer device 106 may use the user interface 110 to send a record fetch request for a particular record (e.g., a subscription record, search query or report request) to the gateway 208. The gateway transfers the record fetch request to the monolithic application 216. The monolithic application 216 generates a custom record fetch request. In some embodiments, the custom record fetch request includes a tenant identifier and a record identifier. The monolithic application 216 forwards the custom record fetch request via the main service API 218 to the work API 226, which forwards the custom record fetch request to the custom field record service 222. The custom field record service 222 uses the tenant identifier and the record identifier to fetch the values for the requested custom record. The custom field record service 222 returns the custom field values of the custom record fetched to the monolithic application 216 via the work API 226 and the main service API 218. The monolithic application 216 generates a global record fetch request, which the monolithic database 214 will process or which the monolithic application 216 will process on the monolithic database 214. In some embodiments, the global record fetch request includes the tenant identifier and the record identifier. The monolithic application 216 receives the global field values for the global fields from the monolithic database 214. In some embodiments, the global record fetch request may appear like a traditional global record storage request. In some embodiments, the monolithic application 216 joins the global field values from the monolithic database 214 with the custom field values from the custom fields database 220 to generate a full record. The monolithic application 216 sends the full record to a receiving device (which may be the requesting device). In some embodiments, the receiving device is the customer device 106. In some embodiments, the receiving device is the gateway 208. In some embodiments, the receiving device may be a computer device such as a server that manages search queries and/or report generation.

The monolithic database 214 may include any type of database, including a relational database management system (RDBMS), object-based database system, and/or the like. The monolithic database 214 may be on premise or cloud-based.

The monolithic application 216 may include hardware, software and/or firmware capable of receiving and processing record storage requests. When processing a record storage request, the monolithic application 216 is capable of partitioning the record storage request into a global record storage request with one or more global field values and a custom record storage request with one or more custom field values, forwarding the global record storage request to the monolithic database 216, and forwarding the custom record storage request to the main service API 218 (which forwards the custom record storage request to the work API 226).

The monolithic application 216 may include hardware, software and/or firmware capable of receiving and processing record fetch requests (whether initiated as a record fetch request, a query, and/or report generation request). When processing a fetch request, the monolithic application 216 is capable of generating a global record fetch request and a custom record fetch request. The monolithic application 216 sends the global record fetch request to the monolithic database 214 to retrieve the one or more global values associated with the one or more global fields associated with the global record. The monolithic application 216 sends the custom record fetch request to the main service API 218 (which forwards the custom record fetch request to the work API 226). The monolithic application 216 is capable of receiving the one or more global record values from the one or more global fields associated with the global record from the monolithic database 214, and of receiving the one or more custom record values from the one or more custom fields associated with the custom record from the custom field database 220. The monolithic application is further capable of joining the one or more global values with the one or more custom values to generate a full record. The monolithic application 216 is further capable of transmitting the full record via the network devices 206 to a receiving device.

The main service API 218 includes hardware, software and/or firmware capable of communication between the monolithic application 216 and the work API 226. The main service API 218 may be capable of using any communication protocol, communication format, encryption, decryption, error correction, load balancing, etc.

The custom field database 220 may include any type of database, including a relational database management system (RDBMS), object-based database system, and/or the like. The custom field database 220 may be on premise or cloud-based.

The custom field metadata service 224 may include hardware, software and/or firmware capable of communicating with the provision API 228 to receive custom field creation requests. The custom field metadata service 224 may include hardware, software and/or firmware capable of generating custom field metadata to generate one or more custom fields associated with a tenant and associated with a record object, in response to a custom field creation request. For example, Verizon may want custom_field 1 for its subscription record, and may want custom_field 2 for its usage record. Similarly, Netflix may want custom_field A and custom_field B for its subscription record. The custom field metadata service 224 is capable of generating the metadata to create these custom fields. The custom field metadata service 224 is capable of processing the generation of new custom fields for a tenant for a particular object that yet has no custom fields (perhaps by generating a new custom field map), and of processing the generation of new custom fields for a tenant for a particular object that already has one or more custom fields (perhaps by updating a previously generated custom field map).

The custom field metadata service 224 may include hardware, software and/or firmware capable of associating a custom field type with each custom field, e.g., an address type, a numerical types, a string type, a financial amount type, etc.

The custom field metadata service 224 may include hardware, software and/or firmware capable of generating a custom field map that it may share with the monolithic application 216 and/or with the custom field record service 222. The custom field map may include a custom field table that identifies the tenant, the record object, and one or more additional custom fields (each field possibly associated with a custom field type). The custom field metadata service 224 may be capable of creating a new custom field map, in some embodiments when the tenant is creating a new custom field for a record with no custom fields, and may be capable of updating an existing custom field map, in some embodiments when the tenant is adding a new custom field for a record that already has custom fields. The custom field map may also be provided to user interface engines to enable presentation of or requests for global and custom field values when generating new records.

The monolithic application 216 may use the custom field map to separate global values from custom values in a payload of a storage request, and/or may use the custom field map to join global values from the monolithic database 214 with the custom field values received from the custom field database 220. In some embodiments, the monolithic application 216 may not need the custom field map, and may operate based solely on knowing the global fields associated with the global record stored in the monolithic database 214. In some embodiments, when generating new custom fields for a tenant for a record that already has custom fields, the custom field metadata service 224 map update the custom field map, may generate a replacement custom field map, or may generate a second map that cooperates with the first map. In some embodiments, the monolithic application 216 will determine the destination of the record storage request based on the custom field map and possibly based on a global field map. In some embodiments, the monolithic application 216 uses only a global field map, e.g., in an embodiment where there is only one custom field storage system 204. In some embodiments, no custom or global object map is needed. Other mechanisms are also possible. Some embodiments may operate without custom field or global field maps, e.g., possibly by using common protocols, predetermined syntax, predetermined naming conventions, broadcasting, multicasting, etc.

The custom field record service 222 may include hardware, software and/or firmware capable of receiving a custom record storage request (including custom field values associated with custom fields associated with a record) from the work API 226. In response to receiving the custom record storage request, the custom field record service 222 is capable of generating and processing a database store function, which the custom field storage service 222 forwards to the custom field database 220 for processing or which the custom field storage service 222 processes on the custom field database 220.

The custom field record service 222 may include hardware, software and/or firmware capable of receiving a custom record fetch request from the work API 226. In response to receiving the custom record fetch request, the custom field record service 222 is capable of generating and processing a custom record fetch function, which the custom field storage service 222 forwards to the custom field database 220 for processing or which the custom field storage service 222 processes on the custom field database 220. Upon receiving the custom field values from the custom field database 220, the custom field record service 222 generates a custom field response (that includes at least the custom field values associated with the custom field fetch request), which it sends to the work API 226 to forward it to the main service API 218. The custom field response may include the custom field values in addition to the tenant identifier and object identifier. The custom field response may include the custom field values in addition to a fetch request identifier, which the monolithic application 216 can use to identify the associated tenant and object.

The provision API 228 includes hardware, software and/or firmware capable of communication between the custom field metadata service 224, the work API 226, the main service API 218 and/or the network devices 206. The provision API 228 may be capable of using any communication protocol, communication format, encryption, decryption, error correction, load balancing, etc.

The work API 226 includes hardware, software and/or firmware capable of communication between the custom field record service 222, the provision API 228, and/or the main service API 218. The work API 226 may be capable of using any communication protocol, communication format, encryption, decryption, error correction, load balancing, etc.

The gateway 208 may include hardware, software and/or firmware capable of receiving and processing tenant requests from the customer devices 106 and of receiving and transmitting responses (e.g., records and/or reports) to the customer devices 106. For example, upon receiving a custom field creation request, the gateway 208 is capable of transmitting the custom field creation request to the provision API 228. Upon receiving a record storage request or a record fetch request, the gateway 208 is capable of transmitting the storage and/or fetch request to the monolithic application 216.

In some embodiments, the gateway 208 is capable of managing queries and/or report generation requests, and generating record fetching requests based on the queries and/or report generation requests. In some embodiments, management of queries and/or report generation requests may be processed by other components, such as by the monolithic application 216, other engines on the network, and/or other services.

Figure 2B:
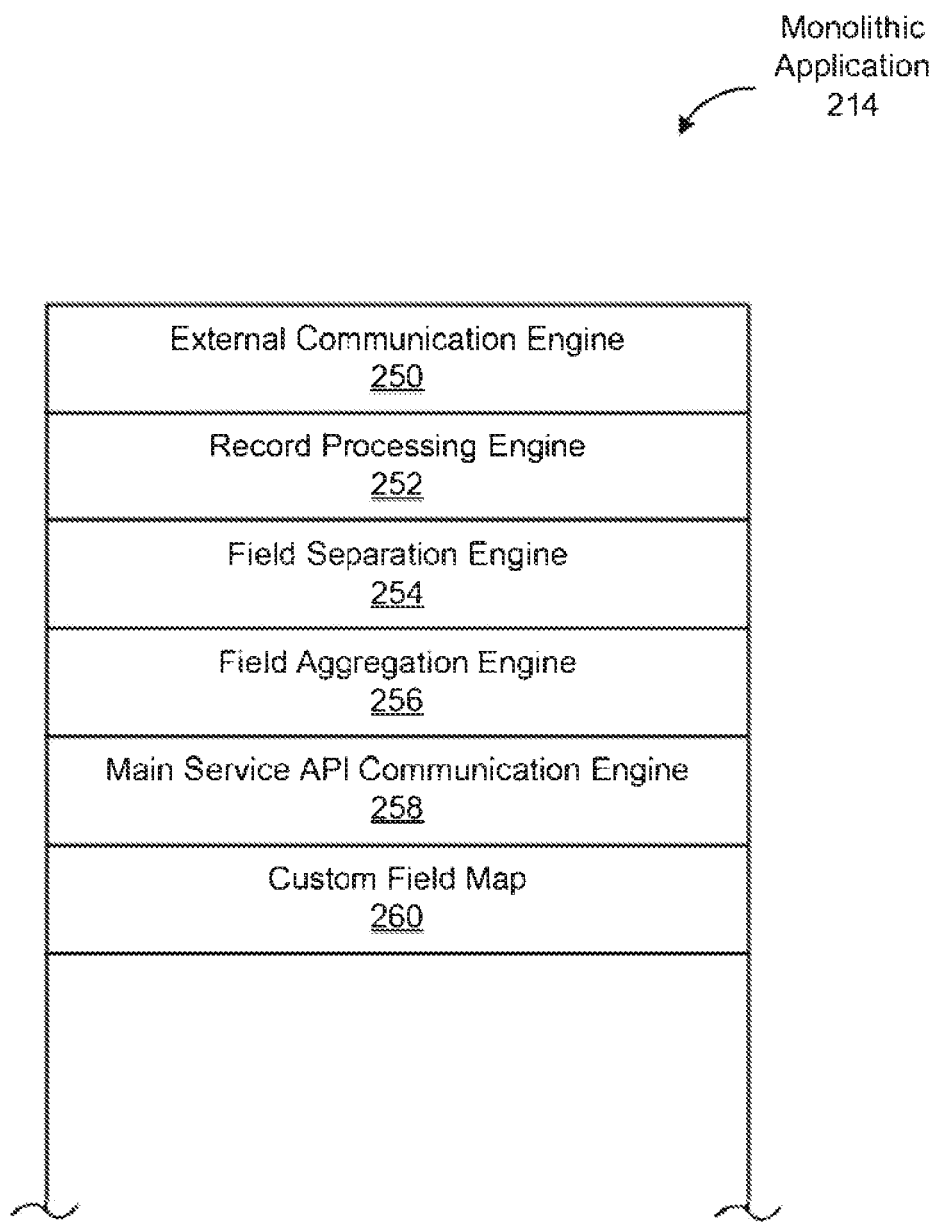
FIG. 2B is a block diagram of a monolithic application, according to some embodiments of the present invention.

FIG. 2B is a block diagram illustrating details of the monolithic application 216, in accordance with some embodiments of the present invention. The monolithic application 216 includes an external communication engine 250, a record processing engine 252, a field separation engine 254, a field aggregation engine 256, a main service API communication engine 258, and a custom field map 260.

The external communication engine 216 includes hardware, software and/or firmware capable of communicating with the network devices 206, e.g., in transferring storage and fetch requests therebetween. The external communication engine 256 may be capable of using any communication protocol, communication format, encryption, decryption, error correction, load balancing, etc. The external communication engine 216 may include an API. In some embodiments, the external communication engine 216 may be the main service API 218 or a component of the main service API 218.

The record processing engine 252 includes hardware, software and/or firmware capable of processing record storage and fetch requests. When processing a storage request, the record processing engine 252 uses the field separation engine 254 and the custom field map 260 to partition the storage request into a global record storage request with one or more global field values and a custom record storage request with one or more custom field values. The record processing engine 252 is also capable of forwarding the global record storage request to the monolithic database 216, and forwarding the custom record storage request to the main service API 218 (which forwards the custom record storage request to the work API 226).

The record processing engine 252 includes hardware, software and/or firmware capable of receiving and processing record fetch requests (whether as a query or a particular record identifier). When processing a fetch request, the record processing engine 252 uses the field separation engine 254 and the custom field map 260 to partition the fetch request into a global record fetch request and a custom record fetch request. The record processing engine 252 sends the global record fetch request to the monolithic database 214 to retrieve the one or more values associated with the one or more global fields associated with the record. The record processing engine 252 sends the custom record fetch request to the main service API 218 (which forwards the custom record fetch request to the work API 226). The record processing engine 252 is also capable of receiving the one or more global field values from the one or more global fields associated with the record from the monolithic database 214, and of receiving the one or more custom field values from the one or more custom fields associated with the record from the custom field database 220. The record processing engine 252 uses the field aggregation engine 256 and the custom field map 260 to join the one or more global values with the one or more custom values to generate a full record. The record processing engine 252 is further capable of transmitting the full record to a receiving device, e.g., via the external communication engine 250 to the customer device 106, to a query engine, to a report generation engine, or the like.

The field separation engine 254 includes hardware, software and/or firmware capable of using a custom field map 260 to partition payloads of record storage requests and to partition record fetch requests into global field record fetch request and a custom field record fetch request. For example, if global fields X, Y, Z for a record object for a tenant are stored in the monolithic database 214 and custom fields A, B, C for the record object for the tenant are stored in the custom field database 220, the custom field map 260 will indicate that the custom field database 220 stores custom fields A, B, C for the record object for the tenant. The field separation engine 254 will obtain the custom field map 260 for the tenant for the record object to identify custom fields A, B, C as stored in the custom field database 220. When performing a record storage request for a tenant associated with the record object, the record processing engine 252 will use the custom field map 260 to identify custom fields A, B, C belonging to the tenant for the record object as being stored in the custom field database 220, and to generate a custom record storage request to be sent to the custom field storage system 204. When performing a record fetch request for a tenant associated with the record object, the record processing engine 252 will use the custom field map 260 to identify custom fields A, B, C belonging to the tenant for the record object as being stored in the custom field database 220, and to generate a custom record fetch request to be sent to the custom field storage system 204.

The field aggregation engine 256 includes hardware, software and/or firmware capable of using a custom field map 260 to aggregate global field values with custom field values to generate a full record for a record object. For example, if global fields X, Y, Z for a record object for a tenant are stored in the monolithic database 214 and custom fields A, B, C for the record object for the tenant are stored in the custom field database 220, the custom field map 260 will indicate that the custom field database 220 stores custom fields A, B, C for the record object for the tenant. The field aggregation engine 256 will obtain the custom field values A, B, C for the tenant for the record object from the custom field database 220 and will obtain the global field values X, Y, Z from the monolithic database 214, and will aggregate them together to generate a full record.

The main service API communication engine 258 includes hardware, software and/or firmware capable of communicating with the main service API 218, e.g., in transferring storage and fetch requests therewith. The main service API communication engine 258 may be capable of using any communication protocol, communication format, encryption, decryption, error correction, load balancing, etc.

FIG. 3 illustrates example global records 300, in accordance with some embodiments of the present invention. As shown, the example global records 300 include records having global fields for all tenants. The example global records 300 include a tenant identifier field 302, a record identifier field 304, a customer name field 306, an account balance field 308, a last invoice field 310, and a status field 312. The example global records 300 illustrate a first record 326 having a tenant identifier value 314 of "123456", a record identifier value 316 of "112233", a customer name value 318 of "Joe Smith", an account balance value 320 of "123.00", a last invoice date value 322 of "4-1-20" and a status value 324 of "active." The example global records 300 illustrate a second record 328 having a tenant identifier value 314 of "234567", a record identifier value 316 of "112234", a customer name value 318 of "Tony Wong", an account balance value 320 of "168.00", a last invoice date value 322 of "4-4-20" and a status value 324 of "active." As shown, for the example record, each of tenant 123456 and tenant 234567 store records for the same set of global fields stored in the monolithic database 216.

FIG. 4 illustrates example custom field records 400, in accordance with some embodiments of the present invention. As shown, the example custom field records 400 includes custom fields for a particular tenant for a particular record. The example custom field records 400 include a first record 426 having a tenant identifier field 402, a record identifier field 404, and a "Bill To" field 406. The example custom field records 400 illustrate a tenant identifier value 408 of "123456" (the same value as the first record 326 of the global records 300), a record identifier value 410 of "112233" (the same value as the first record 326 of the global records), and a "Bill To" value 412 of "Pam Smith". As shown, tenant 123456 created a "Bill To" custom field for record 112233 (e.g., the subscription record). Tenant 123456 created a first record 426 for the record 112233 belonging to "Joe Smith" with a "Bill To" field value of "Pam Smith".

FIG. 5 illustrates an example full record 500, in accordance with some embodiments of the present invention. The example full record 500 represents the payload information of a record storage request sent to the monolithic application 216 from a tenant or of a fetch response generated by the monolithic application 216 in response to a record fetch request. The example full record 500 includes global and custom field values for global and custom fields to be stored in or retrieved from the monolithic database 214 and the custom field database 220. The example full record 500 includes the global fields and global values of the first record 326 of the global records 300 of FIG. 3 combined with the custom fields and custom field values of the first record 426 of the custom records 400 of FIG. 4. As shown, the example full record 500 includes a tenant identifier field 502, a record identifier field 504, a customer name field 506, an account balance field 508, a last invoice field 510, a status field 512, and a "Bill To" field 514. The example global record 500 illustrates a tenant identifier value 516 of "123456", a record identifier value 518 of "112233", a customer name value 520 of "Joe Smith", an account balance value 522 of "123.00", a last invoice date value 524 of "4-1-20", a status value 526 of "active", and a "Bill To" value 528 of "Pam Smith".

Figure 6:
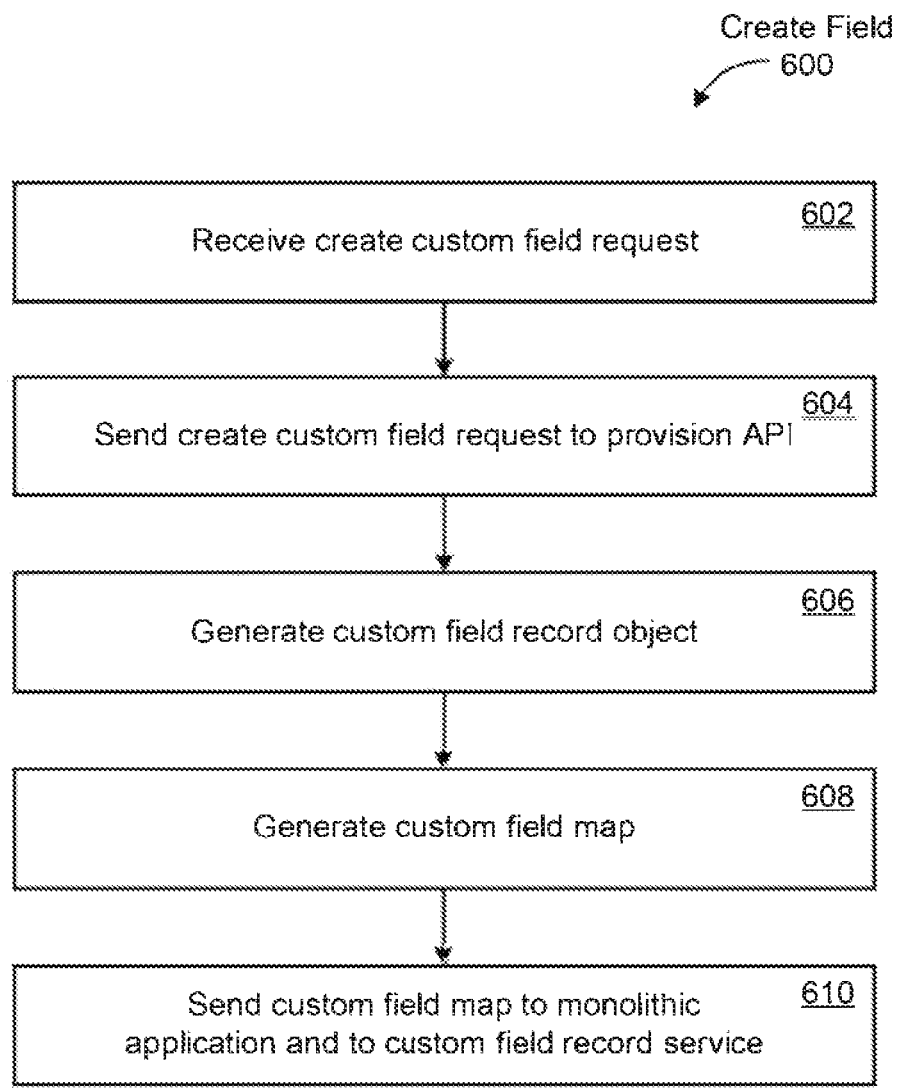
FIG. 6 is a flowchart of a method of creating a custom field, according to some embodiments of the present invention.

FIG. 6 is a flowchart of a method 600 of creating a custom field according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

Method 600 begins with the gateway 208 in step 602 receiving a create custom field request, e.g., from a tenant. The create custom field request identifies the tenant, the associated record object, the desired custom field (or desired custom fields), and possibly a custom field type (or custom field types). In some embodiments, the create custom field request is provided over several communications. The gateway 208 in step 604 sends the create custom field request to the provision API 228, which forward the create custom field request to the custom field metadata service 224. The custom field metadata service 224 in step 606 generates a custom field record object, e.g., that includes a tenant identifier, a record object identifier, the custom field (or custom fields), and/or the custom field type (or custom field types). The custom field metadata service 224 in step 608 generates a custom field map, which the custom field metadata service 224 in step 610 sends to the monolithic application, to the custom field record service, and to any other systems that may use it, such as to a user interface, query engine or report generation engine.

Figure 7:
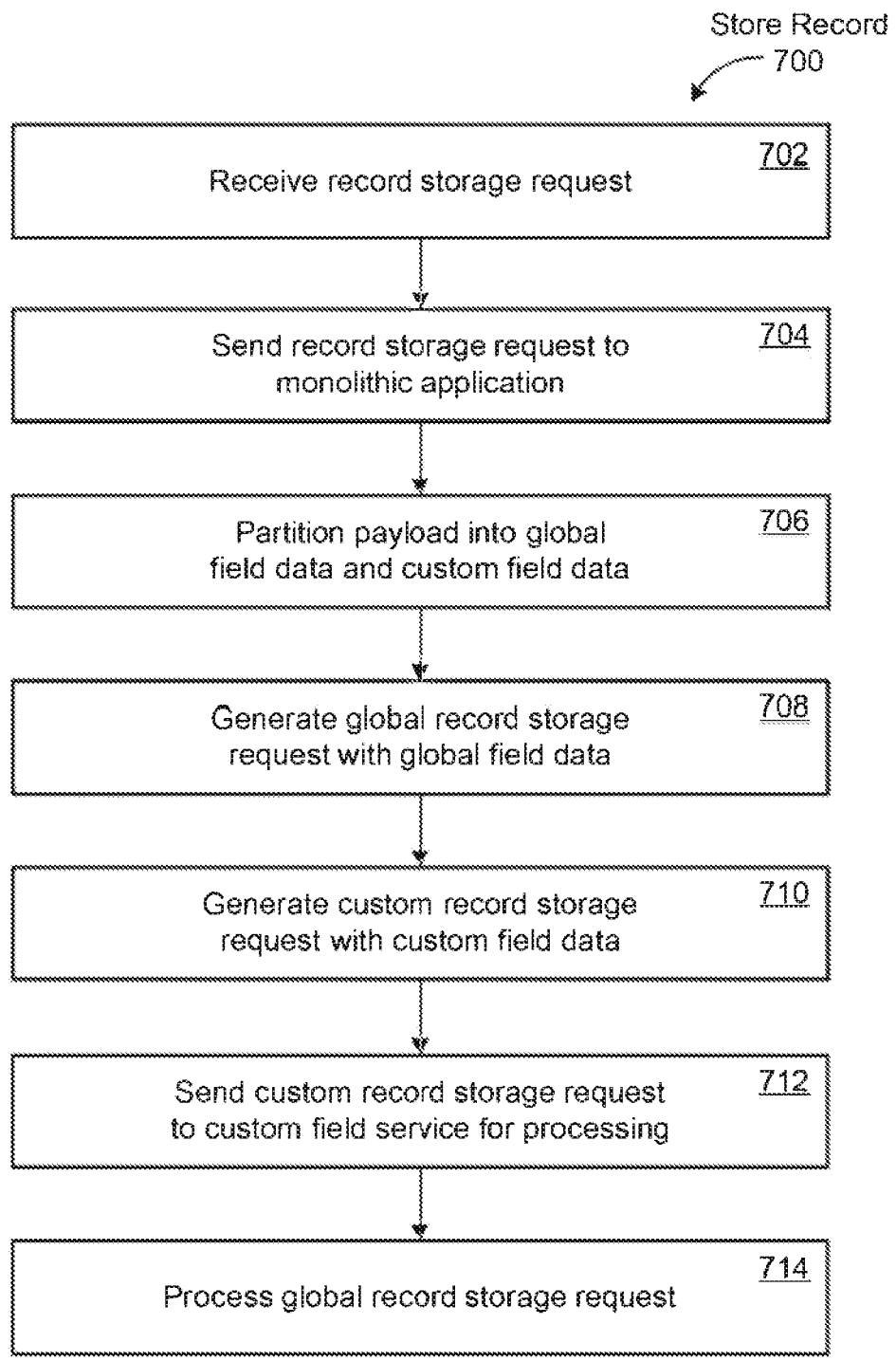
FIG. 7 is a flowchart of a method of storing a record including one or more custom fields, according to some embodiments of the present invention.

FIG. 7 is a flowchart of a method 700 of storing a record including custom fields according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The method 700 begins with the gateway 208 in step 702 receiving a record storage request from a tenant. The gateway 208 in step 704 sends the record storage request to the external communication engine 250 of the monolithic application 216. In some embodiments, the create custom field request is provided over several communications. The field separation engine 254 of the monolithic application 216 in step 706 uses the custom field map 260 to partition the payload information of the record storage request into global field data and custom field data. The record processing engine 252 in step 708 generates a global record storage request with the global field data and in step 710 a custom record storage request with the custom field data. The main service API communication engine 258 in step 712 sends the custom record storage request to the main service API 218, which sends the custom record storage request to the work API 226, which sends the custom record storage request to the custom field record service 222. The custom field record service 222 and custom field database 220 processes the custom record storage request. The record processing engine 252 and monolithic database 214 in step 714 processes the global record storage request.

Figure 8:
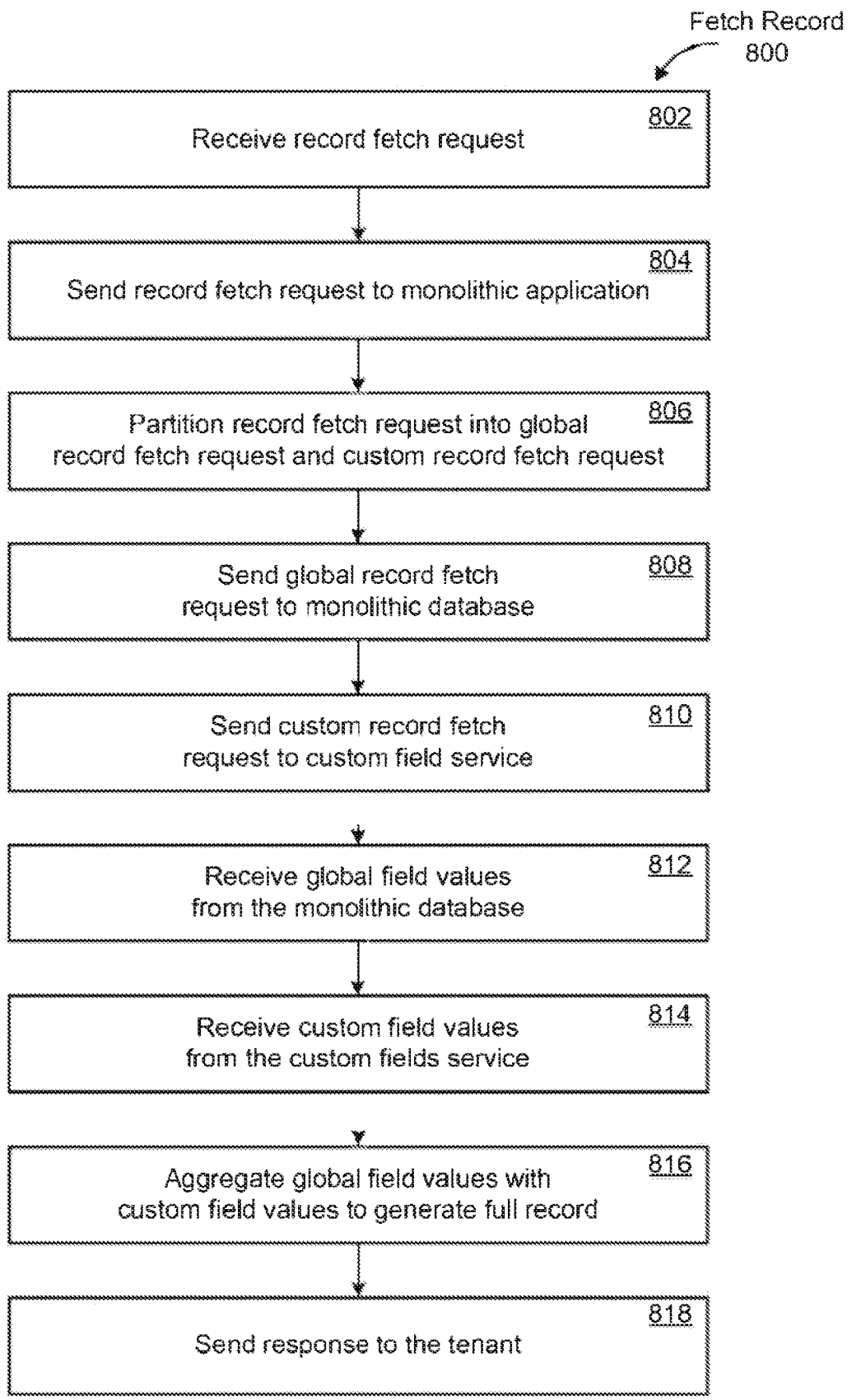
FIG. 8 is a flowchart of a method of fetching a record including one or more custom fields, according to some embodiments of the present invention.

FIG. 8 is a flowchart of a method 800 of fetching a record including custom fields according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The method 800 begins with the gateway 208 in step 802 receiving a record fetch request. In some embodiments, the record fetch request may be in the form of a request for a particular record, in the form of a search query that gets converted into one or more record fetch requests, or in the form of a report generation request that gets converted into one or more record fetch requests. Conversion of a search query or a report generation request may occur on the gateway 208, at the monolithic application 216, or elsewhere on the network system 100 (e.g., by a query processing engine or report generation engine located on a server). In some embodiments, the global record fetch request includes the tenant identifier and the record identifier. In some embodiments, the custom record fetch request includes the tenant identifier and the record identifier. The gateway 208 or server (query engine or report generation engine) in step 804 sends the record fetch request to the monolithic application 216. The field separation engine 254 in step 806 uses the custom field map 260 to partition the record fetch request into a global record fetch request and into a custom record fetch request. The record processing engine 252 in step 808 sends the global record fetch request to the monolithic database 214 to retrieve the global field values. The monolithic database 214 provides the global field values to the record processing engine 252. The main service API communication engine 258 in step 810 sends the custom record fetch request to the main service API 218, which sends the custom record fetch request to the work API 226, which sends the custom record fetch request to the custom field record service 222. The custom field record service 222 and custom field database 220 processes the custom record fetch request to retrieve custom field values. The custom field record service 222 sends the custom field values to the work API 226, which sends the custom field values to the main service API 218, which sends the custom field values to the main service API communication engine 258, which provides the custom field values to the record processing engine 252. The record processing engine 252 in step 816 sends the global field values and the custom field values to the field aggregation engine 256, which aggregates the global field values and the custom field values into a full record. The record processing engine 252 sends the full record to the external communication engine 250, which forwards the full record to a receiving device. In some embodiments, the requesting device may be the custom device 106, the gateway 208, the query engine to generate a response with the record, or the report generation engine to generate a report based on the record. The gateway 208 in step 818 sends the record or the response (generated by the query engine, report generation engine or other server) to the tenant.

Figure 9:
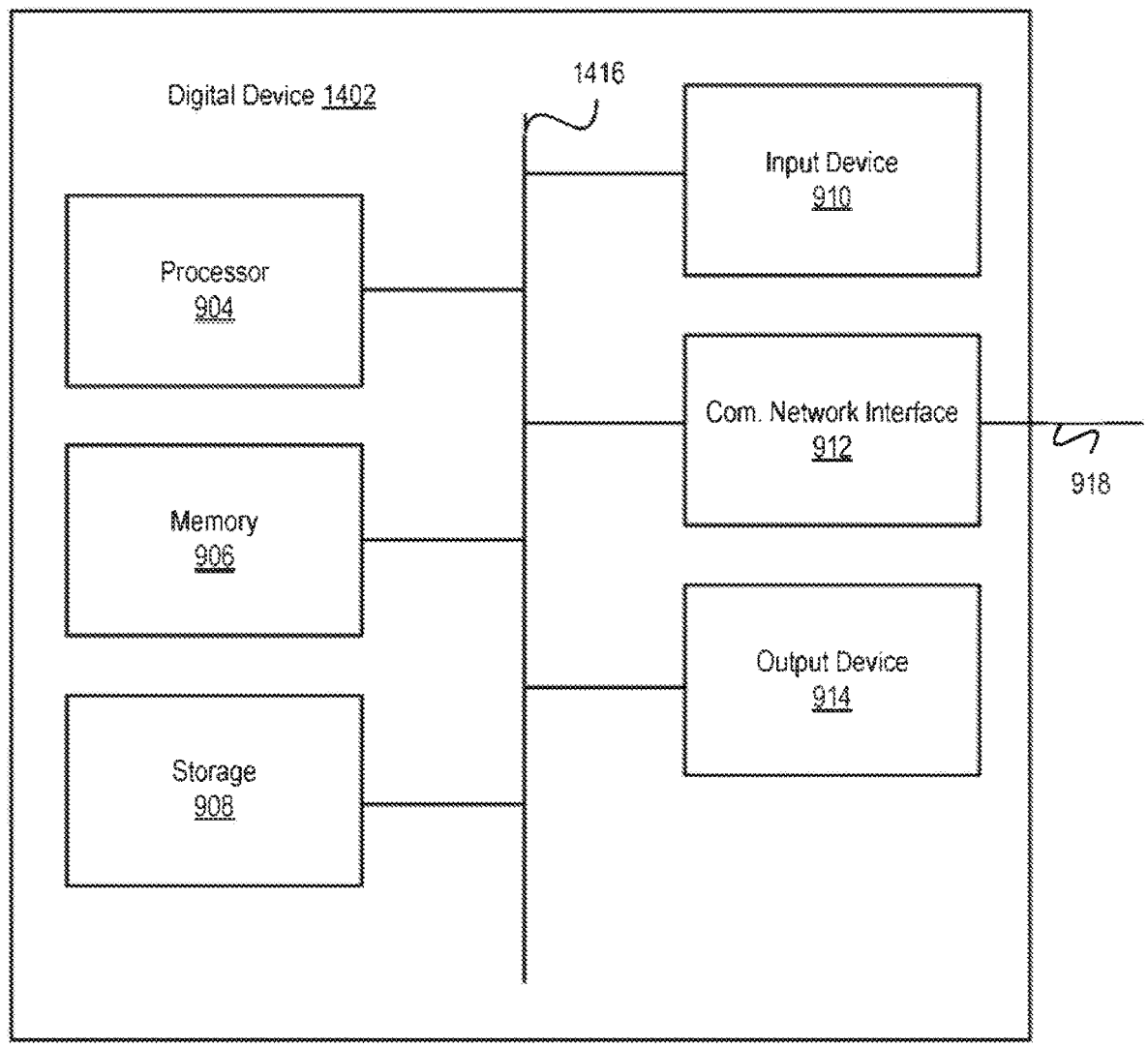
FIG. 9 is a block diagram of an example computer system for implementing the features disclosed herein, according to some embodiments of the present invention.

FIG. 9 is a block diagram of a computing device 900. Any of the systems, engines, datastores, and/or networks described herein may comprise an instance of one or more computing devices 900. In some embodiments, functionality of the computing device 900 is improved to perform some or all of the functionality described herein. The computing device 900 comprises a processor 904, memory 906, storage 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory 906 stores data. Some examples of memory 906 include storage devices, such as RAM, ROM, RAM cache, virtual memory, etc. In various embodiments, working data is stored within the memory 906. The data within the memory 906 may be cleared or ultimately transferred to the storage 908.

The storage 908 includes any storage configured to retrieve and store data. Some examples of the storage 908 include flash drives, hard drives, optical drives, cloud storage, and/or magnetic tape. In some embodiments, storage 908 may include RAM. Each of the memory 906 and the storage 908 comprises a computer-readable medium, which stores instructions or programs executable by processor 904.

The input device 910 may be any device that inputs data (e.g., mouse and keyboard). The output device 914 may be any device that outputs data and/or processed data (e.g., a speaker or display). It will be appreciated that the storage 908, input device 910, and output device 914 may be optional. For example, the routers/switchers may comprise the processor 904 and memory 906 as well as a device to receive and output data (e.g., the communication network interface 912 and/or the output device 914).

The communication network interface 912 may be coupled to a network (e.g., network 104 or 206) via the link 918. The communication network interface 912 may support communication over an Ethernet connection, a serial connection, a parallel connection, and/or an ATA connection. The communication network interface 912 may also support wireless communication (e.g., 802.11 a/b/g/n, WiMax, LTE, WiFi). It will be apparent that the communication network interface 612 may support many wired and wireless standards.

It will be appreciated that the hardware elements of the computing device 900 are not limited to those depicted. A computing device 900 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 904 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The databases/datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant system, comprising:
   one or more hardware processors;
   a monolithic database configured to store global records, each global record of the global records including global fields common for all tenants of the multi-tenant system, the monolithic database configured to store a particular global record in response to a particular global record storage request and to retrieve the particular global record in response to a particular global record fetch request;
   a custom field database configured to store custom records, each custom record of the custom records including one or more custom fields for a tenant of the tenants of the multi-tenant system, the custom database configured to store a particular custom record including one or more particular custom fields in association with the particular global record in response to a particular custom record storage request and to retrieve the particular custom record in response to a particular custom record fetch request;
   a custom field record service configured to process the particular custom record storage request by instructing the custom field database to store one or more particular custom field values of the particular custom record for the particular tenant, and to process the particular custom record fetch request by instructing the custom field database to retrieve the one or more particular custom field values of the particular custom record for the particular tenant; and
   a monolithic application configured to receive a record storage request or a record fetch request, the monolithic application configured to partition the record storage request into the particular global record storage request and the particular custom record storage request, the monolithic application configured to send the particular custom record storage request to the custom field record service, the monolithic application configured to partition the record fetch request into the particular global record fetch request and the particular custom record fetch request, the monolithic application configured to send the particular custom record fetch request to the custom field record service.

2. The multi-tenant system of claim 1, wherein each global record includes a tenant identifier and a record identifier.

3. The multi-tenant system of claim 1, wherein each custom record includes a tenant identifier and a record identifier.

4. The multi-tenant system of claim 1, wherein the monolithic application partitions the record storage request into the particular global record storage request and the particular custom record storage request using a custom field map.

5. The multi-tenant system of claim 1, wherein the monolithic application partitions the record fetch request into the particular global record fetch request and the particular custom record fetch request using a custom field map.

6. The multi-tenant system of claim 1, further comprising a work Application Programming Interface (API) configured to receive the particular custom record storage request or the particular custom record fetch request and to communicate the particular custom record storage request or the particular custom record fetch request to the custom field record service, wherein the work API is accessible only internally.

7. The multi-tenant system of claim 6, further comprising a main service API configured to receive the particular custom record storage request or the particular custom record fetch request from the monolithic application and to communicate the particular custom record storage request or the particular custom record fetch request to the work API.

8. The multi-tenant system of claim 1, further comprising a custom field metadata service configured to generate the one or more particular custom fields for the particular tenant for the particular record.

9. The multi-tenant system of claim 8, further comprising a provision API configured to receive a particular custom field generation request to generate the one or more particular custom fields for the particular tenant for the particular record.

10. The multi-tenant system of claim 8, wherein the custom field metadata service is configured to generate a custom field map for the monolithic database to use to partition the record storage request or the record fetch request.

11. The multi-tenant system of claim 1, further comprising a second custom database and a second custom field record service.

12. A method implemented by a multi-tenant system, the method comprising:
   storing global records in a monolithic database, each global record of the global records including global fields common for all tenants of the multi-tenant system;
   storing custom records in a custom field database, each custom record of the custom records including one or more custom fields for a tenant of the tenants of the multi-tenant system;
   receiving a record storage request associated with a particular tenant of the tenants of the multi-tenant system;
   partitioning the record storage request into a particular global record storage request and a particular custom record storage request;

storing in the monolithic database for the particular tenant a particular global record including particular global field values in response to the global record storage request;

sending the particular custom record storage request to a custom field record service; and storing in the custom field database for the particular tenant a particular custom record including one or more particular custom fields in association with the particular global record in response to the custom record storage request.

13. The method of claim 12, wherein each global record includes a tenant identifier and a record identifier.

14. The method of claim 12, wherein each custom record includes a tenant identifier and a record identifier.

15. The method of claim 12, wherein the partitioning the record storage request into a particular global record storage request and a particular custom record storage request includes using a custom field map.

16. The method of claim 12, further comprising sending the particular custom record storage request to a main service Application Programming Interface (API), the main service API accessible only by the monolithic application.

17. The method of claim 16, further comprising sending the particular custom record storage request by the main service API to a work API, the work API being accessible only internally.

18. The method of claim 12, further comprising generating the one or more particular custom fields for the particular tenant using a custom field metadata service.

19. The method of claim 18, further comprising receiving a custom field creation request by a provision API to generate the one or more particular custom fields for the particular tenant for the particular record.

20. The method of claim 18, further comprising generating a custom field map for the monolithic database to use to partition the record storage request.

21. The method of claim 12, further comprising:

receiving a record fetch request;

partitioning by the monolithic application the record fetch request into a particular global record fetch request and a particular custom record fetch request;

sending the particular global record fetch request to the monolithic database to retrieve the particular global field values;

sending the particular custom record fetch request to the custom field record service to retrieve the one or more particular custom field values;

aggregating the particular global field values and the one or more particular custom field values to generate a full record; and sending the full record to a computer device.

* * * * *